Patented June 7, 1927.

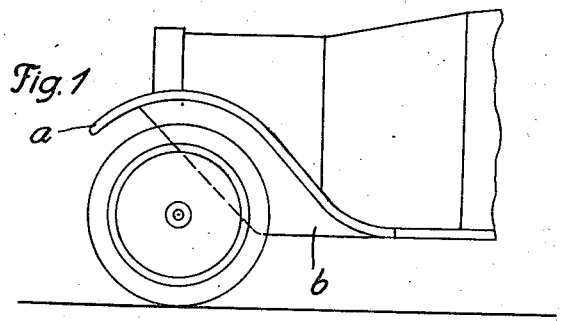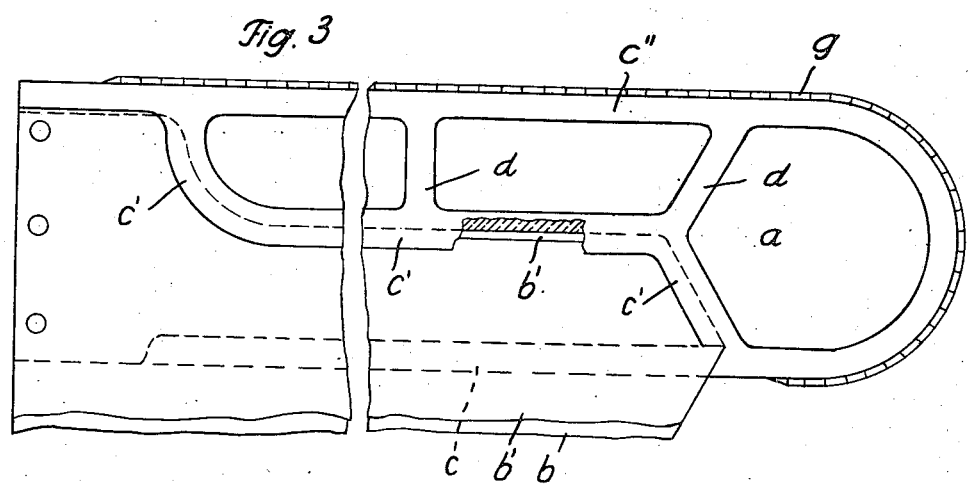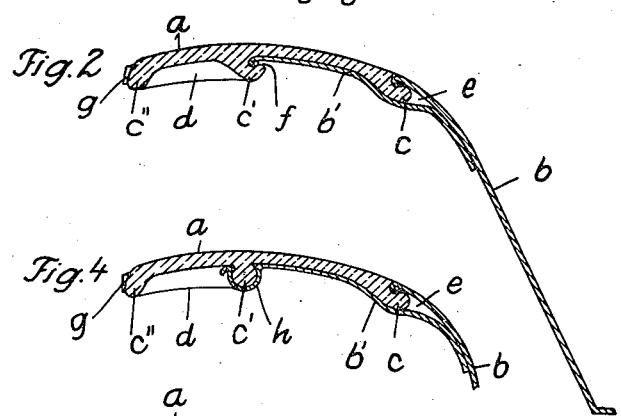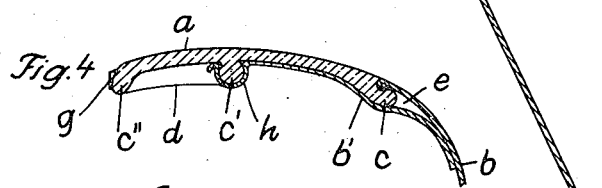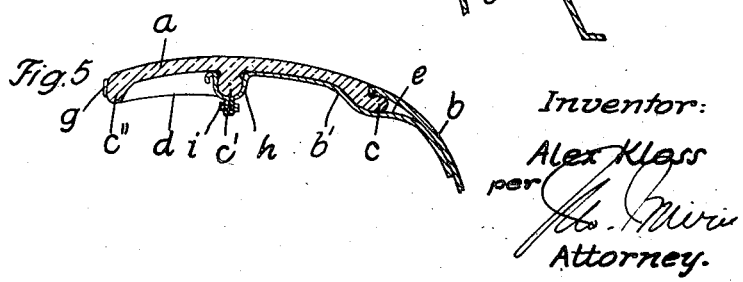

1,631,420

UNITED STATES PATENT OFFICE.

ALEX KLOSS, OF AACHEN-ROTHE ERDE, GERMANY.

MUD GUARD FOR VEHICLES.

Application filed January 2, 1926, Serial No. 78,940, and in Germany November 7, 1924.

This invention relates to mud-guards for vehicles, especially for motor vehicles, and it has more particularly reference to mud-guards of the kind comprising a rigid skirt of metal or the like attached to the vehicle frame and a dust and mud catching member carried by the said skirt and made of a flexible material such as rubber, leather or the like.

The invention has for its primary object to provide the flexible catching member with a plurality of beads serving to stiffen the member and used for connecting it with the skirt which in turn is provided with means adapted to interengage with the beads.

According to the invention, the skirt preferably has fastened to it short of its free edge a sheet metal supporting plate arranged to extend for a certain distance underneath the flexible catching member. This supporting plate forms with the edge porton of the skirt a resilient groove wherein to receive an edge bead of the flexible catching member, and at its free edge it engages a groove formed by another bead of the catching member or it is provided with a groove adapted to embrace a bead of suitable contour.

Another object of the invention is to provide the outer edge of the flexible catching member with a lining of metal fittings designed to protect the flexible member against injuries without in any way interfering with its flexibility.

The mud-guard according to the invention is of a great strength and of a simple construction, its parts may be readily assembled and disconnected and nevertheless are securely held together in their operative position.

The invention is illustrated in the accompanying drawings in which:

Fig. 1 is a side elevation of the front of a motor vehicle showing my mud-guard in position;

Fig. 2 is a cross-section of the mud-guard on an enlarged scale;

Fig. 3 is a bottom view of the guard shown in Fig. 2, some parts being broken away;

Figs. 4 and 5 are sections, similar to Fig. 2, of two slightly modified forms.

The mud-guard comprises a dust and mud catching member $a$ of flexible material and a sheet metal skirt $b$ which is fastened to the vehicle frame in any suitable manner. The catching member $a$ is provided at the underside along its inner edge with a longitudinal bead $c$. It further has a middle bead $c'$ the main portion of which extends longitudinally while its end portions extend more or less transversely in opposite directions, see more particularly Fig. 3. The outer edge of the member $a$ is likewise provided with a longitudinal bead $c''$. Arranged between the beads $c'$ and $c''$ are transverse beads $d$. All of the beads serve to stiffen the flexible member $a$. The beads $c$ and $c'$ are besides made use of for fastening the member $a$ to the skirt $b$. The skirt $b$ carries near its free edge a sheet metal supporting plate $b'$ forming with the skirt $b$ a resilient groove $e$ designed to receive and embrace the bead $c$. The supporting plate $b'$ projects for a certain distance below the member $a$. The outer edge of the plate $b'$ has a contour corresponding to the path of the bead $c'$ and fits in a groove $f$ formed by the bead $c'$. The outer edge of the plate $b'$ may also be shaped so as to constitute a grooved portion $h$ adapted to receive and clamp a suitably shaped bead $c'$, as shown in Fig. 4. In the embodiment illustrated by Fig. 5, the grooved portion $h$ is formed in two parts adapted to clamp between them the bead $c'$ and to be fastened together by bolts $j$ or the like fastening means. While the beads $c$, $c'$, $c''$, $d$ are shown as formed integrally with the member $a$, they may also be formed separately and fastened to the member $a$ in any suitable manner.

The supporting plate $b'$ may be fastened to the skirt $b$ by welding, riveting or bolting or it may be formed integrally with the skirt by pressing.

The flexible member $a$, and more particularly its outer edge, is preferably provided with metal fittings $g$ designed to protect the flexible member against injuries. These fittings may be in the form of overlapping metal plates or nails fastened in the rubber mass of the member $a$.

It will further be within the spirit of my invention to establish the connection between the catching member $a$ and the member $b'$, $b'$, by providing the latter with suitable beads and the member $a$ with corresponding grooves for receiving such beads.

Having thus described my invention, what I claim as new and desire to secure by Letters-Patent, is:—

1. A mud guard for vehicles comprising a rigid skirt secured to a vehicle frame, a catching member supported solely by the skirt said member being of flexible material and formed with a plurality of beads on one surface thereof for stiffening of the material, and means carried by the skirt to interfit with a plurality of said beads to thereby interlock the skirt and member, and provide a means for supporting the member over the skirt.

2. A mud-guard for vehicles comprising a sheet metal skirt fastened to the vehicle frame and a flexible catching member carried by the skirt, a plurality of longitudinally and transversely extending beads on the flexible catching member, and resilient grooves formed by the skirt for receiving and tightly clamping in them some of the beads of the flexible member.

3. A mud-guard for vehicles comprising a rigid skirt fastened to the vehicle frame and a flexible catching member carried by the skirt, longitudinally extending beads on the underside of the flexible member at its edges and in its middle, a sheet metal supporting plate fastened to the skirt short of its free edge and arranged to extend for a certain distance underneath the flexible member, a resilient groove formed by and between the free edge of the skirt and the body portion of the said supporting plate, said resilient groove being designed to receive and hold the bead at the inner edge of the flexible member, and means at the free inner edge of the supporting plate designed to be interengaged with the middle bead of the flexible member.

4. A mud-guard for vehicles comprising a rigid skirt fastened to the vehicle frame and a flexible catching member carried by the skirt, stiffening beads on the flexible member, means on the skirt adapted to be interengaged with the said beads for supporting and holding the flexible member, and metal fittings on the outer surface of the flexible member for protecting it against injuries.

In testimony whereof I have signed my name to this specficaton.

ALEX KLOSS.